Figure 1:
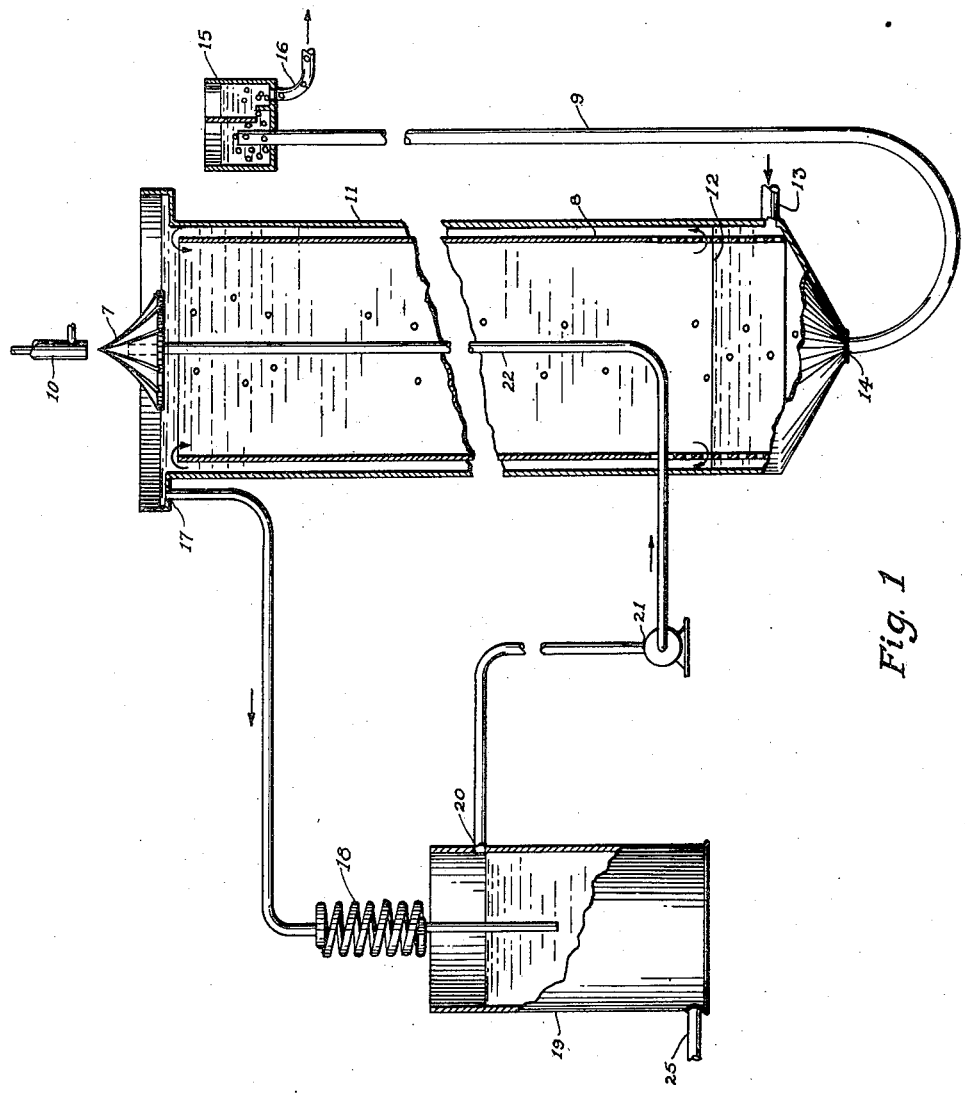

June 1, 1948.　　　　P. D. VALAS　　　　2,442,387
CIRCULATION OF OIL IN BEAD FORMING TOWER
Filed Aug. 22, 1945　　　　　　　　　　2 Sheets-Sheet 1

Peter D. Valas
INVENTOR

BY　Raymond W. Barclay
AGENT

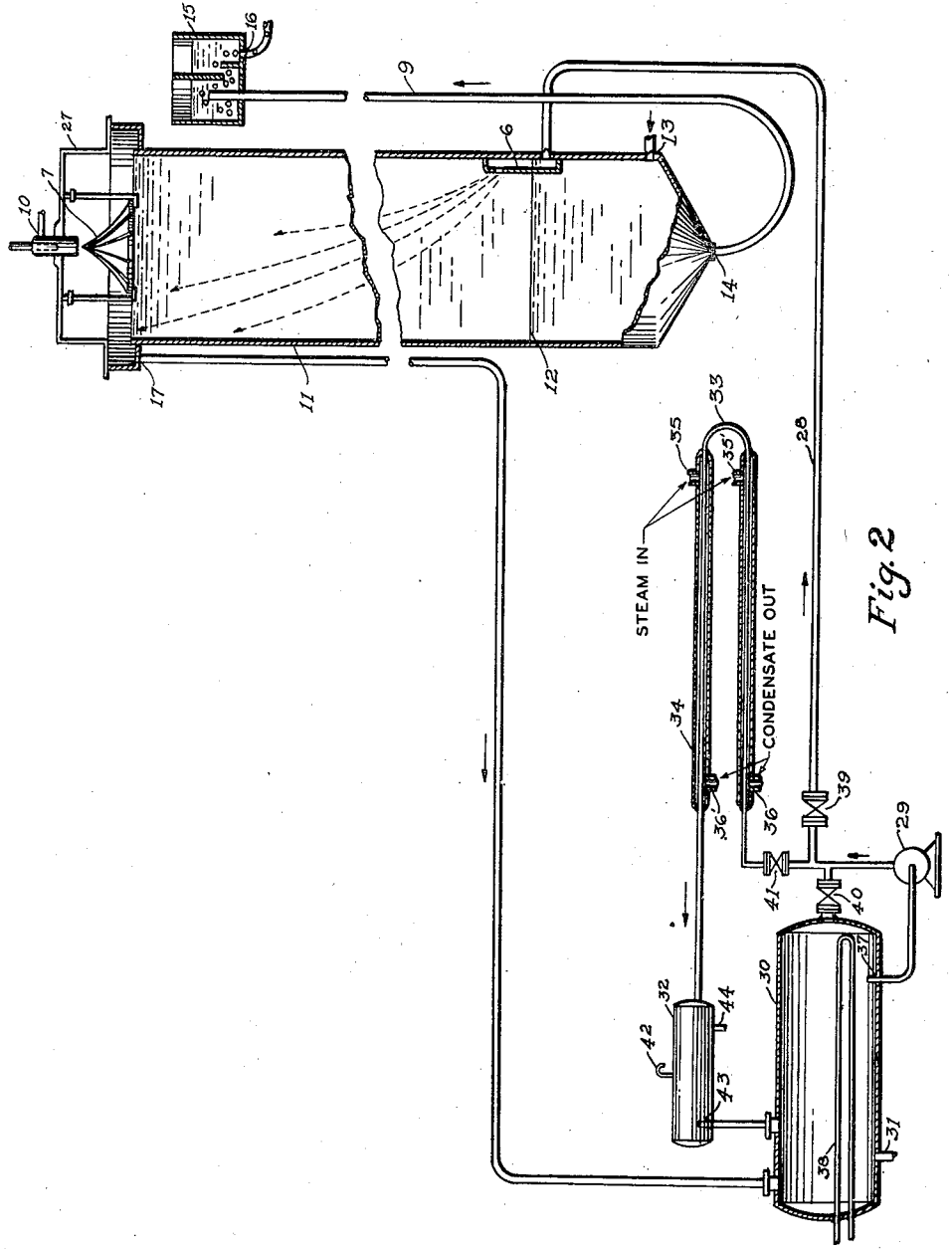

Patented June 1, 1948

2,442,387

UNITED STATES PATENT OFFICE 2,442,387

CIRCULATION OF OIL IN BEAD FORMING TOWER

Peter D. Valas, Woodbury, N. J., assignor to Socony-Vacuum Oil Company, Incorporated, a corporation of New York Application August 22, 1945, Serial No. 612,061

6 Claims. (Cl. 252—317)

This invention relates to an improved process and apparatus for forming globular pellets of gel and more particularly to a novel method of removing foreign material accumulating in the vessel in which said gel pellets are being formed.

The invention, more specifically, is concerned with an improvement in the process disclosed in U. S. Patent 2,385,217, issued September 18, 1945, to Milton M. Marisic. There, a method is described for making inorganic oxide gels in the form of spheroidal particles which comprises admitting an aqueous colloidal solution, capable of setting to a hydrogel, in the form of globules into a column of water-immiscible liquid where the colloidal particles gel and are removed by washing in a stream of water.

During the formation of the gel particles or beads, certain contaminating materials, comprising essentially thin films of gel and air-occluded gel fragments, have a tendency to accumulate in the column of water-immiscible liquid and gradually build up to a concentration great enough to affect the efficiency of the bead forming system, partially clogging flow outlets and, in general, slowing down the production of beads. The foreign materials accumulating may even to some extent be occluded or adsorbed by the gel pellets being formed to yield contaminated beads. Such a product is highly undesirable when employed either as an adsorbent or in catalytic operations.

Moreover, in certain processes, it is desirable to employ gel beads having a uniform shape as nearly spherical as possible. This is particularly the case in operations in which a contact bed is utilized, for example, as in the catalytic cracking of heavy hydrocarbons to lighter material of the nature of gasoline. Spheroidal pellets, so used, pack in a uniform manner and eliminate the channeling of vapors or fluids through a bed of such particles.

In accordance with the present invention, it has been found that the removal of contaminating matter accumulating in the column of water-immiscible liquid can be accomplished and at the same time the spheroidal shape of the particles can be improved by circulation of the water-immiscible fluid in the bead forming column at such a rate so as not to interfere with the gelation of the hydrosol particles.

The circulation of the water-immiscible fluid flowing preferably in a direction opposite to the fall of the beads affords a means of removing contaminating material collecting in the column. The fluid containing the contaminating material is withdrawn and filtered through a suitable bed of adsorbent material or alternatively it may be heated and the impurities allowed to settle out. The uncontaminated fluid is then recirculated through the bead forming column and the whole operation repeated.

The fluid medium to be circulated may be any liquid or combination of liquids which is immiscible with water such as, for example, petroleum naphtha, kerosene, hydrocarbon oils, etc. When the density of the fluid is lower than that of water, the fluid is supported over a layer of water and the colloidal solution from a mixing nozzle is introduced at the top of the column of fluid. For a fluid more dense than water, the procedure is reversed; the colloidal solution being ejected into the bottom of the fluid and the globules rise up through the fluid, gel, and pass into a water layer which conducts the gel away for processing.

The shapes of the formed hydrogel are dependent upon the rate at which the globules of colloidal solution travel through the water-immiscible liquid, which in turn is dependent upon the viscosity and relative density of the fluid medium employed. Furthermore, in order to produce as uniform beads as possible and reduce to a minimum the formation of undesirably small beads, it is important to maintain the level of the column of water-immiscible liquid constant. In accordance with this invention it has been found by circulation of the fluid medium in the bead forming column that fluctuations in the water-immiscible liquid level can be eliminated and the shape of the gel particles being formed more easily controlled to give particles having an improved uniform spheroidal shape.

The invention will be more readily understood by reference to the following drawings:

Figure 1 is an elevation in partial section of apparatus for forming gel beads; and Figure 2 is a view of a modified form of apparatus according to the invention.

Referring to Figure 1, a mixing nozzle 10, is mounted over a conical divider 7, which projects into a column of water-immiscible fluid in tank 11. At the bottom of tank 11 is a layer of water which forms an interface 12 with the column of said fluid. Water is continuously supplied through inlet 13. The interface at 12 is maintained by properly adjusting the height of the conduit 9 in correlation with the density of the fluid medium and rate at which water is supplied at 13. The flow of water carries away the gel pellets through outlet 14 and through conduit 9 to weir box 15, which permits visual observation of the water rate. The pellets then pass through outlet 16 to suitable washing and treating stages.

A circular liner 3 open at the top, having a perforated circumference near its bottom and extending from below the water-water-immiscible liquid interface nearly up to the water-immiscible liquid level permits the free circulation of the water-immiscible fluid in the tank. The excess fluid is withdrawn at the top through outlet 17, circulated through a heater 18 into a settling tank 19 where contaminating materials and water accumulating in the fluid are removed through outlet 25. The fluid is withdrawn from the settling tank through an outlet 20, located near its surface by means of a suction pump 21 and forced through pipe 22 to the underside of the divider which is so baffled as to permit the fluid to flow down in a plurality of thin streams and be recirculated through the tank.

The colloidal solution from which the pellets are formed is mixed and admitted through the nozzle 10 to the top of the divider which is fluted and divides the stream of sol into a plurality of smaller streams which enter the column of water-immiscible liquid as small droplets. The surface of the divider is curved in the manner shown to provide a steep pitch at the apex while the surface of the divider near the base approaches the horizontal. Due to the gradually changing pitch of the divider surface, the streams flow smoothly and at the bottom of the divider are introduced at a reduced velocity to the body of immiscible liquid. The length of the column and the gelation time of the sols are so regulated that the droplets will gel before passing out of the water-immiscible fluid into the water layer.

The underside of the conical divider from which the water-immiscible fluid issues is so baffled that the fluid flow therefrom is parallel to and at about the same velocity as the sol streams passing down the top surface of the divider. The height of the water-immiscible liquid is maintained at a fairly definite level and is so regulated that it just covers the bottom of the conical divider. Thus, there is essentially no turbulence or mixing at the points of juncture of the two streams. This will inhibit occlusion of water-immiscible liquid in the gel pellets.

The particles pass from the water-immiscible fluid into a layer of water where they are washed in a stream and pass out of the tank to suitable washing and treating stages. The water-immiscible fluid slowly circulates through the tank. The excess fluid is drawn off, passes through a cleaning apparatus and is recirculated back to the bead forming column.

Circulation of water-immiscible liquid in the forming column greatly assists in reducing fluctuation of the water-immiscible liquid level to a minimum. In order to produce as uniform beads as possible and reduce to a minimum the formation of undesirably small beads, it is important to reduce fluctuations of the immiscible liquid level to a minimum and maintain this level up to the base of the conical divider so that the gel streams do not have to drop any distance from the divider into the liquid. Because of slight variations in water pressure and slight changes of bead concentration in the water in conduit 9 of the forming column, the immiscible liquid-water-head balance in the system changes. By maintaining a flow of the water-immiscible liquid through the forming column the level is maintained constant while the immiscible liquid-water interface and immiscible liquid overflow from the column compensate for any immiscible liquid-water-head changes.

The inorganic oxide gels in which contamination has been substantially eliminated and whose shape has been improved by the above-described invention include silica gel, silica-alumina, silica-stannic oxide, silica-ceria, silica-thoria, silica-alumina-thoria, silica-alumina-stannic oxide, silica-alumina-ceria. The method may be further extended to improve the shape of many other types of gels.

The time of gelation is dependent upon temperature, pH and concentrations of reactants. The pH and concentration being constant, the time of gelation will decrease with an increase in temperature. Thus, the time of gelation can be regulated by controlling the temperature of the circulated-water-immiscible fluid through which the particles fall. By warming the water-immiscible fluid in heater 18, and circulating through the bead forming tower, the time of gelation of sol particles can be reduced.

A modified form of apparatus is shown in Figure 2 in which a mixing nozzle 10 is mounted over a conical divider 7 which is supported by bracket 27. The remainder of the tank proper is similar to that shown in Figure 1. The circulation of the water-immiscible liquid however is carried out in a novel manner by withdrawing the contaminated fluid at outlet 17 and passing into a settling tank 30 provided with a heating coil 38. There, the contaminating bodies present settle to the bottom of the tank and are drawn off at outlet 31. The fluid to be recirculated is withdrawn from the tank through outlet pipe 37 which extends up into the tank a short distance so that the uncontaminated fluid is withdrawn from the layer overlying the sediment of foreign material which collects at the bottom of the tank. The fluid drawn off passes to pump 29 which forces the fluid through pipe 28 leading to tank 11. The fluid enters the tank through a baffled plate 6, is recirculated and the whole operation is repeated.

It has been found advisable in recirculation of the fluid to remove small amounts of water contained therein. Accordingly, by careful control of valves 39, 40 and 41 a portion of the recirculated fluid is continuously conducted through a long hairpin-shaped pipe 33 surrounded by a steam jacket 34 through which steam is permitted to enter at openings 35 and 35' and the condensate withdrawn at outlets 36 and 36'. Upon passage of the water-immiscible fluid through the steam-heated area, small amounts of water contained in the fluid are flashed off. The fluid and vapors enter a small tank 32, the vapors escape through vent 42 and the main body of fluid passes through outlet 43 into the settling tank 30. Outlet 44 of the small tank permits removal of any remaining condensed water in the fluid.

While the water-immiscible fluid may be circulated in the same direction as the fall of beads, it has been found preferable to circulate in a direction opposite to the fall of beads. In that manner the contaminating materials are removed more efficiently and, in general, larger and more spherical beads result than if the fluid flow is downward.

In addition to providing a means for removing foreign matter accumulating in the bead forming tank, and improving the shape of the beads, the circulation of water-immiscible fluid prevents the collision of sol droplets falling through the tank and also prevents to a large extent gel occlusion on the walls of the tank.

While the scope of the invention is not to be limited by any theory, it is believed that the improved shape of beads, that is, those having as nearly spherical shape as possible, results from a counter-action of the eddy currents set up in the tank by circulation of the water-immiscible liquid. It has been noted in the making of gel beads by the method of said Marisic patent that multidirectional and erratic eddy currents are established in the column of water-immiscible liquid by the fall of the particles therein. It is thought that by circulation of the liquid according to this invention that such currents have been largely overcome leading to the more spherical bead obtained.

The following examples will serve to illustrate the invention:

*Example I*

A solution of sodium silicate containing 105 grams of $SiO_2$ per liter was prepared by diluting "N" brand of sodium silicate (28.7% $SiO_2$, 8.9% $Na_2O$). This solution was mixed with a second solution containing 34.10 grams of aluminum sulphate and 25.05 grams of sulphuric acid per liter at the ratio of 1.00 volumes of the former solution to 0.780 volume of the latter. The resulting colloidal solution leaving the mixing nozzle passed over a conical divider which separated the stream of colloidal solution into a plurality of smaller streams which fell in the form of droplets into a column of gas oil whose depth was eight feet. The globules of solution fell through the oil and gelled before passing into the layer of water located beneath the oil. The oil was circulated by flowing from the underside of the distribution cone, as shown in Figure 1, and fell at approximately the rate as the particles of hydrosol flowing down the outer surface of the divider.

The time of gelation for the concentrations and proportions of reactants given above was about ten seconds, while pH was 6.9. The gas oil employed was a fraction of Oklahoma City Gas oil having a boiling range of 471° to 708° F. and a specific gravity of 0.846.

The spherical particles of gel were conducted out of the bottom of the column in a stream of water and on removal from the water, washed with petroleum naphtha to remove oil from their surface. The beads were then slowly and uniformly dried at 180° F. until shrinkage was substantially complete and the drying was continued at a gradually increasing temperature up to 1050° F. at which temperature it was maintained for two hours. The silica-alumina gel retained its improved spheroidal shape during the washing and drying operations and was free of contaminating matter.

*Example II*

A solution of sodium silicate containing 105 grams of $SiO_2$ per liter prepared from "N" brand sodium silicate was mixed with a second solution containing 27.10 grams of aluminum sulphate and 19.95 grams of sulphuric acid per liter. These solutions were mixed at the ratio of 1.00 volume of the former to 0.980 volume of the latter. The resulting hydrosol had a gelation time of about twenty seconds and a pH of 6.9. The colloidal solution was ejected from the mixing nozzle and passed over the conical divider and fell as small droplets through a column of gas oil, similar to that of Example I. The globules set to a gel in the oil column and passed into the layer of water below where they were removed by a stream of water for further processing and drying as described in Example I.

The oil was circulated by an apparatus, as shown in Figure 2, where the contaminated oil was withdrawn, led through a pipe heated with steam at a temperature of about 105-130° C., which served to flash off water contained in the oil. The oil was led to a settling tank where contaminating matter was allowed to settle out and the cleaned oil recirculated to the bead forming tank. The circulation of the oil was in direction opposite to the fall of beads, and at a rate varying between about 0.02 feet per minute and about 0.20 feet per minute. The resulting hydrogel bead had an improved spherical shape and was free of foreign matter.

I claim:

1. A process for the manufacture of spheroidal pellets of inorganic oxide hydrogel which comprises forming a gelable hydrosol of inorganic oxide, flowing said hydrosol downward over a generally conical fluted surface to divide said hydrosol into a plurality of streams, permitting said sol to fall through a body of water-immiscible liquid and set to a firm hydrogel therein, the gelation time of said sol and the depth of said body of liquid being so correlated that gelation will occur therein, continuously removing a stream of said liquid from said body, passing said stream through a cleaning means to remove contaminating materials therefrom and returning uncontaminated liquid to said body.

2. A process for the manufacture of spheroidal pellets of inorganic oxide hydrogel which comprises forming a gelable hydrosol of inorganic oxide, flowing said hydrosol downward over a generally conical fluted surface to divide said hydrosol into a plurality of streams into a body of water-immiscible liquid, maintaining the level of said body substantially at the end of said conical fluted surface, permitting said sol to fall through said body of liquid and set to a firm hydrogel therein, the gelation time of said sol and the depth of said body of liquid being so correlated that gelation will occur therein, continuously removing a stream of said liquid from said body, passing said stream through a cleaning means to remove contaminating materials therefrom and returning uncontaminated liquid to said body.

3. A process for the manufacture of spheroidal pellets of inorganic oxide hydrogel which comprises forming a gelable hydrosol of inorganic oxide, permitting said sol to fall in the form of globules through a body of water-immiscible liquid and set to a firm hydrogel therein, the gelation time of said sol and the depth of said body of liquid being so correlated that gelation will occur therein, continuously removing a stream of said liquid from said body, flashing off water contained in said liquid, removing contaminating materials therefrom by allowing said materials to settle out, drawing off a stream of uncontaminated liquid from a layer overlying the contaminating materials and recirculating said liquid to said body.

4. A process for the manufacture of spheroidal pellets of inorganic oxide hydrogel which comprises forming a gelable hydrosol of inorganic oxide, flowing said hydrosol downward over a generally conical fluted surface to divide said hydrosol into a plurality of streams into a body of water-immiscible liquid, maintaining the level of said body substantially at the end of said conical fluted surface, permitting said sol to fall through said body of liquid and set to a firm hydrogel therein, the gelation time of said sol and the depth of said body of liquid being so correlated that gelation will occur therein, flowing said liquid outwardly from below said surface at about the rate at which said sol enters said body, continuously removing a stream of said liquid from said body, removing contaminating materials therefrom by allowing said materials to settle out, drawing off a stream of uncontaminated liquid from a layer overlying the contaminating materials and recirculating said liquid to said body.

5. An apparatus for forming generally spheroidal hydrogel pellets comprising a vertical liquid chamber, a conical fluted surface for dividing a stream of hydrosol into a plurality of smaller streams, the end of said surface resting on the level of liquid in said chamber, an outlet to withdraw liquid from said chamber, a means to remove contaminating materials from said liquid, an inlet to admit uncontaminated liquid into said chamber, an inlet to admit water to said chamber, an outlet to withdraw water and formed hydrogel pellets from the bottom of said chamber and a means to control the position of liquid-liquid interface in said chamber.

6. An apparatus for forming generally spheroidal hydrogel pellets comprising a vertical liquid chamber, a conical fluted surface for dividing a stream of hydrosol into a plurality of smaller streams, the end of said surface resting on the level of liquid in said chamber, a means to control the liquid level in said chamber, an inlet to admit liquid to said chamber, an outlet to withdraw liquid and formed hydrogel pellets from the bottom of said chamber and means to control the position of liquid-liquid interface in said chamber.

PETER D. VALAS.

REFERENCES CITED

The following references are of record in the file of this patent:

UNITED STATES PATENTS

| Number | Name | Date |
|---|---|---|
| 1,614,636 | Wachtel | Jan. 18, 1927 |
| 2,284,248 | Baker | May 26, 1942 |
| 2,384,455 | Daley | Sept. 11, 1945 |
| 2,385,217 | Marisic | Sept. 18, 1945 |